Jan. 3, 1928.
M. HARRISON
1,655,145
WASHING, GRINDING, AND EXHIBITING DEVICE
Original Filed Nov. 14 1925    4 Sheets-Sheet 3
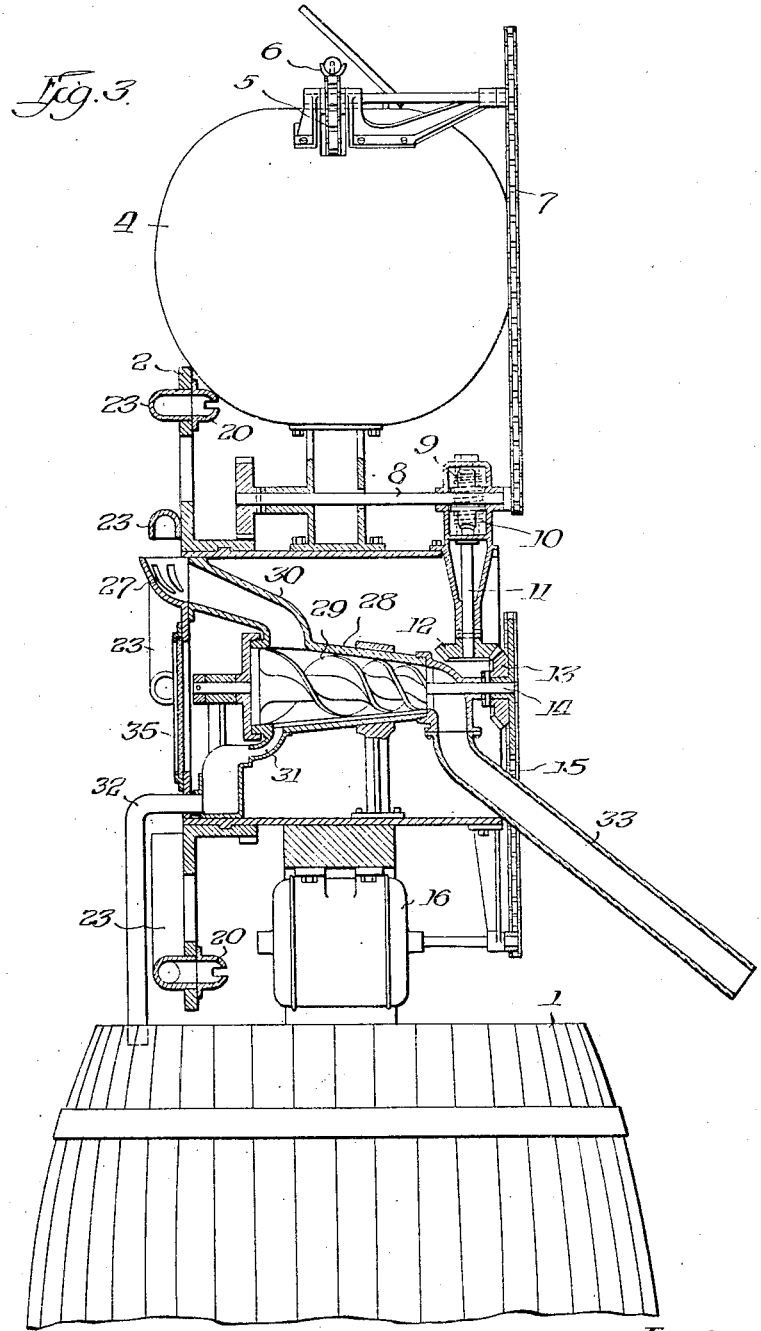

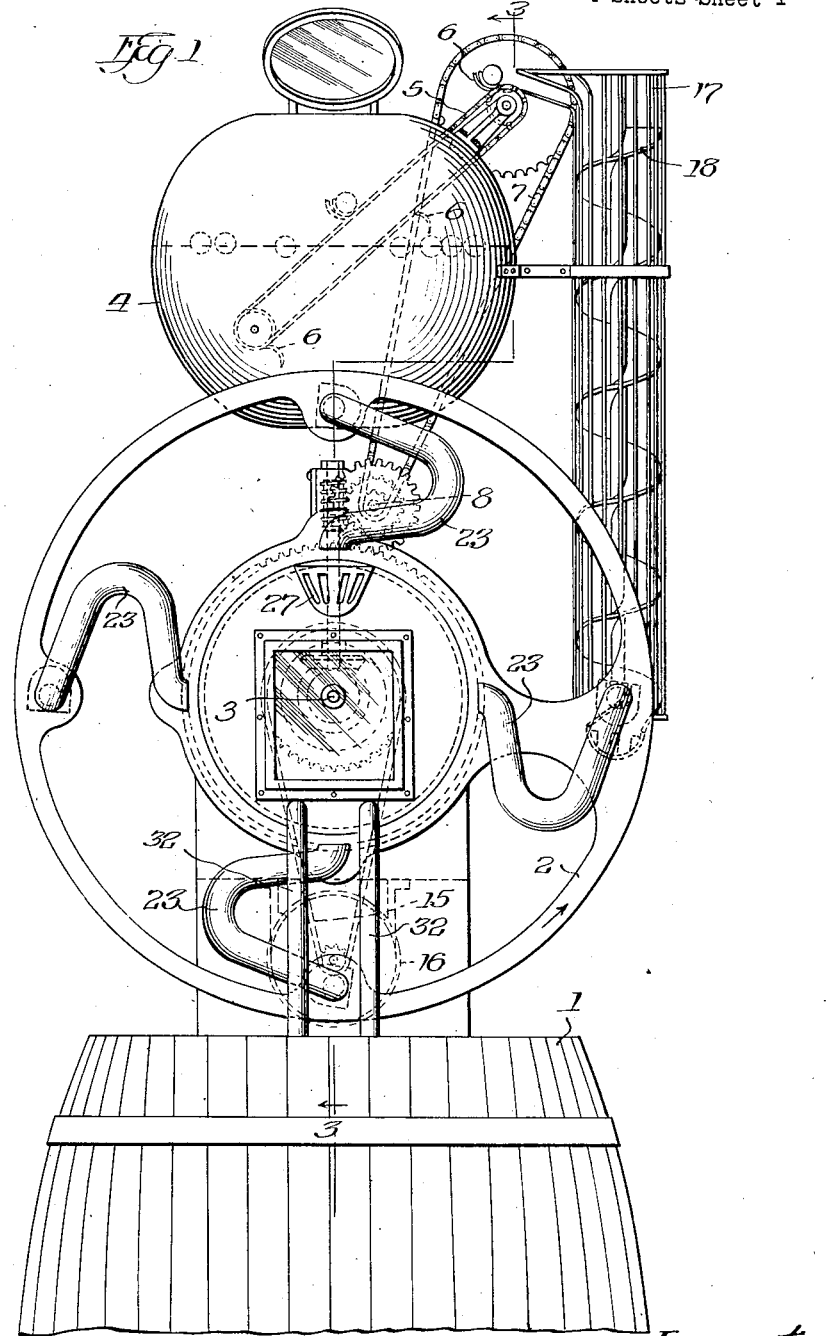

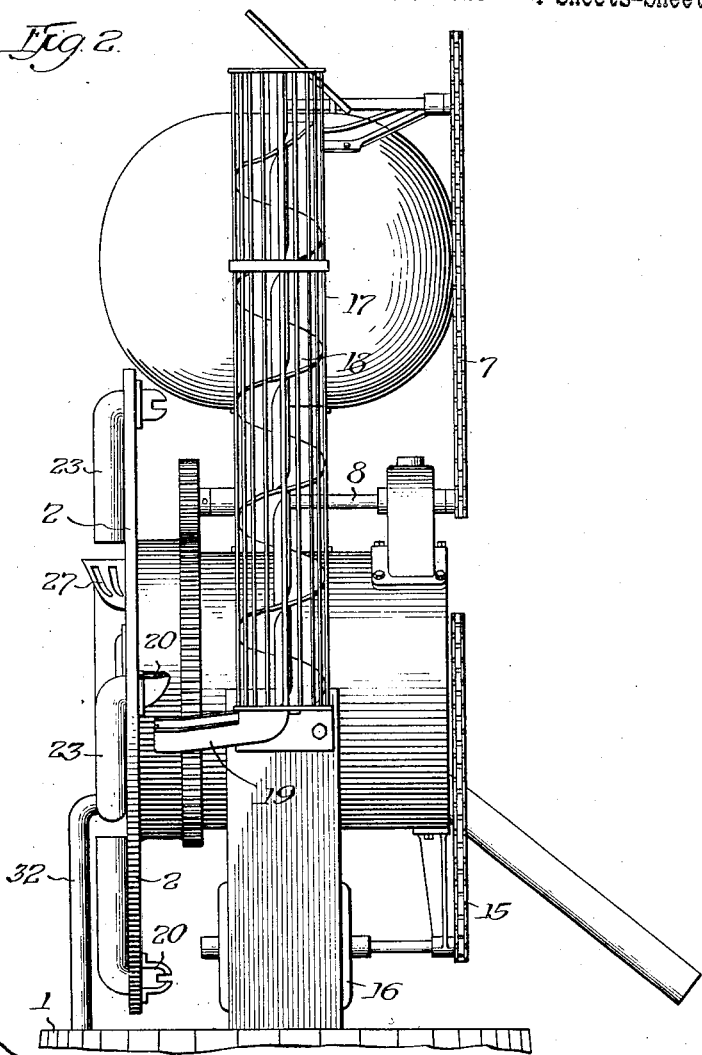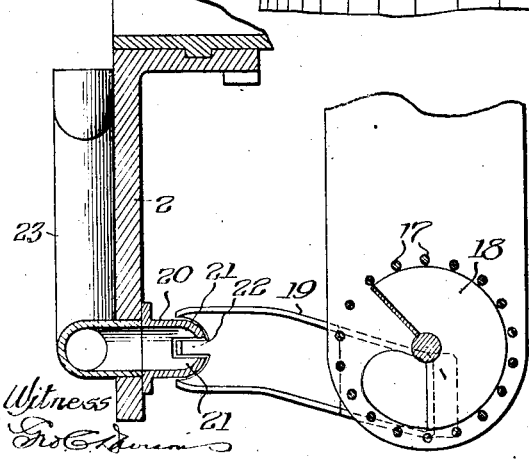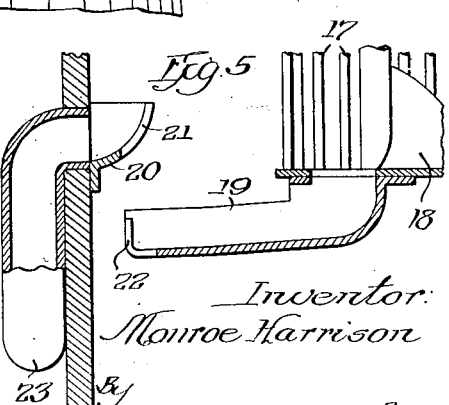

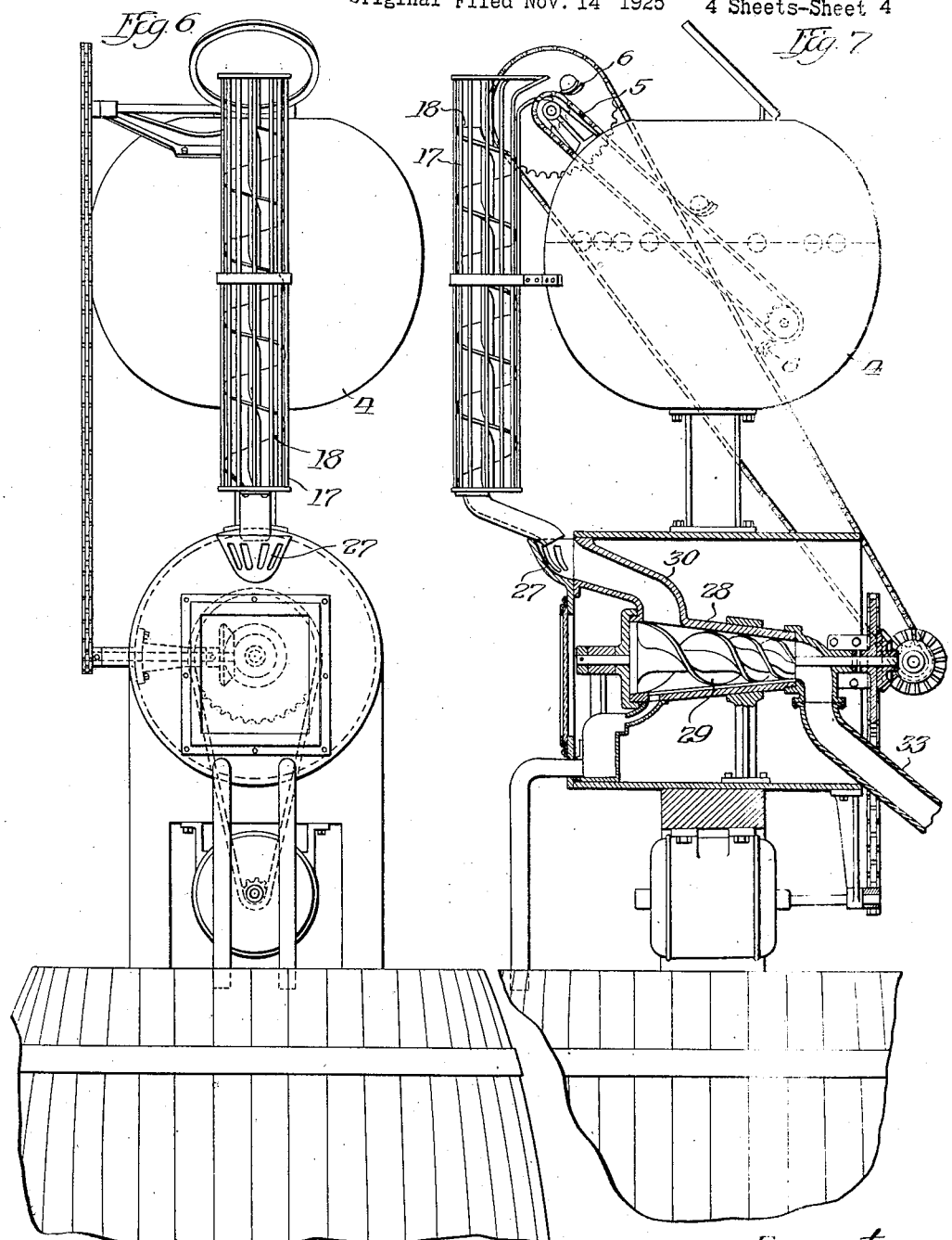

Patented Jan. 3, 1928.

1,655,145

UNITED STATES PATENT OFFICE.

MONROE HARRISON, OF CHICAGO, ILLINOIS.

WASHING, GRINDING, AND EXHIBITING DEVICE.

Application filed November 14, 1925, Serial No. 69,031. Renewed October 22, 1927.

My invention relates to advertising machines, and particularly machines for advertising fruit juices or drinks.

One of the objects of the invention is to provide a simple, practical and advantageous form of machine of the class specified.

Another object of the invention is to arrange for the actual grinding of the fruit to prepare the fruit juice or drink.

Another object of the invention is to arrange for the automatic carrying or transferring of the fruit from a washing or other receptacle to the grinding apparatus, and also to accomplish this result in such manner that the moving fruit will be seen and so attract attention and serve for advertising purposes.

In the accompanying drawings Fig. 1 is a front elevation of an advertising machine embodying my invention;

Fig. 2 is a side elevation of the same;

Fig. 3 is a vertical section taken on line 3—3 in Fig. 1;

Figs. 4 and 5 are views of details of construction;

Fig. 6 is a front elevation of a modified form of machine; and

Fig. 7 is a side elevation of the same.

Referring to the drawings, and particularly to Figs. 1 to 5, inclusive, I show a machine having a barrel 1 as a base and also having a rotary wheel 2 on a spindle or axes 3, and also preferably having a receptacle 4 mounted above the wheel 2, the receptacle 4 being desirably provided for washing purposes and to such intent containing water by which the fruit such as oranges may be washed.

I also show an arrangement such as a traveling conveyer or carrier by which the oranges may be withdrawn and lifted from the receptacle 4, as for example, a sprocket chain 5 provided with fingers or gripping devices 6—6 adapted to engage and collect the fruit and lift it out of the receptacle 4. The conveyer 5 may be driven by a sprocket chain 7 extending down to and driven by a driving shaft 8 which is in turn driven by a worm and screw connection 9 and 10 (Fig. 3) with a vertical shaft 11, driven by gear connection 12 and 13 with shaft 14, which is in turn driven by sprocket chain 15 by motor 16.

The fruit collected by the conveyer 5 is delivered to a conveyer 17, preferably having a spiral screw 18 and arranged in a vertical manner so that the fruit will run down the spiral blade or chute 18 for delivery as desired. In the arrangement shown in the figures under consideration, arrangement is made to deliver the fruit from conveyer 17 to a trough or outlet 19 arranged in the rear of wheel 2 so that the fruit may be collected by the wheel 2. To such end wheel 2 is provided with rearwardly projecting cups or collecting devices 20 having a bifurcated end forming fingers 21—21, (Fig. 4), adapted to fit in corresponding recesses in the end of trough 19, the latter having a projecting portion 22 to fit in the recess between members 21—21, whereby oranges or other fruit at the outer end of trough 19 will be picked up by the devices 20—20.

Wheel 2 is preferably provided with ducts or passages through which the fruit collected from trough 19 may travel, such passages, for example, as the tubes or pipes 23—23, whose outer ends are connected with the front ends of cup devices 20, so that fruit collected by the cups 20—20 will pass into tubes 23—23 and then move inwardly toward the center of wheel 2, as said wheel is rotated in the direction indicated by arrow in Fig. 1.

A receiving member conveniently in the form of a cup 27 is arranged to receive the articles of fruit from the wheel tubes or passages 23. This cup 27 may be located in front of the wheel and below the inner ends of the tubes 23 so that when the latter are revolved upwardly by rotation of wheel 2, the fruit will travel down said tubes 23 and into cup 27, from which latter the fruit articles may be taken or delivered for any desired purpose.

As a preferred arrangement I show a mill by which the fruit may be ground, the structure shown consisting of a shell 28 containing a rotary blade 29. A tube or duct 30 is shown for conveying the food articles from receiving cup 27 to said mill 28—29, and a tube 31 is shown for conveying the juice from the mill into tubes or pipes 32—32 to the barrel 1, into which it may be delivered for use as desired. Another tube 33 is shown for receiving the pulp and skin from the mill 28—29, and conveying the same rearwardly where it may be discharged as refuse.

It will be seen that the articles of fruit will be visible in the tubes 23—23, it being understood that the same are preferably made of glass and hence the rotation of these tubes with the articles of fruit traveling downwardly in them will cause attraction and thereby make the device effective for advertising purposes. Furthermore, the operation of the mill 28—29 will to some extent be visible through the glass 35, as will also the downward flow of the juice through the glass tubes 32—32, so that this will also attract attention and be effective for advertising purposes.

Referring to Figs. 6 and 7, I show a machine in which the fruit articles may be conveyed directly from the washing device or receptacle 4 to the mill or grinding device 28—29, without passing through or having to do with a rotary display member such as the wheel 2, shown in the preceding figures. In this modified machine the conveyer 17 which receives the fruit articles from the conveyer 5 is arranged to deliver said articles directly to the cup or hopper 27, from which they run down the chute or trough 30 to the grinding member 29, the conveyer 17 being provided with an outlet pipe or duct 40 for that purpose. Thus in this modification the fruit articles may have a shorter path of travel from the washing device to the grinding mill and the machine will be more simple and compact and less expensive, while at the same time there will be such a display of the fruit articles and the grinding of the same as to make an effective advertising machine.

It will be understood that changes and modifications may be made without departing from the spirit of the invention.

What I claim is:

1. A machine of the class specified comprising fruit grinding mechanism, a receptacle for the articles of fruit, means for removing said fruit articles from said receptacle, and means for conveying said articles when so removed to said grinding mechanism, said conveying means including a rotary wheel having radially disposed ducts for the fruit articles.

2. A machine of the class specified comprising fruit grinding mechanism, a receptacle for the articles of fruit, means for removing said fruit articles from said receptacle, and means for conveying said articles when so removed to said grinding mechanism, said conveying means including a vertically arranged spiral conveyer and a rotary wheel to receive the food articles from said spiral conveyer and provided with radially disposed ducts.

3. A machine of the class specified comprising fruit grinding mechanism, a receptacle for the articles of fruit, means for removing said fruit articles from said receptacle, and means for conveying said articles when so removed to said grinding mechanism, said removing means comprising a traveling conveyer provided with gripping fingers.

4. A machine of the class specified comprising fruit grinding mechanism, a receptacle for the articles of fruit, means for removing said fruit articles from said receptacle, and means for conveying said articles when so removed to said grinding mechanism, said removing means comprising a traveling conveyer provided with gripping fingers, and said conveying means including a vertically arranged spiral device for receiving fruit articles from said gripping fingers.

5. A device of the class specified provided with a washer for fruit articles, a tubular conveyor having its upper end located near the washer, a belt conveyor for lifting articles from the washer and dropping them into the tubular conveyor, and a display wheel having means for taking the articles from the bottom of the tubular conveyor and transporting them in view for attracting attention.

6. The combination with the receptacle of means for lifting the fruit therefrom and a conveyer to receive the fruit from said lifting means and convey it downwardly therefrom, and a movable carrying member to receive the fruit from said conveyer, said member comprising a rotary device with means for holding the fruit as it rotates.

7. The combination with the receptacle of means for lifting the fruit therefrom and a conveyer to receive the fruit from said lifting means and convey it downwardly therefrom, and a movable carrying member to receive the fruit from said conveyer, said member comprising a rotary device with radially arranged ducts or passages.

In witness whereof, I hereunto subscribe my name this 19th day of October, A. D., 1925.

MONROE HARRISON.